United States Patent
Nakadai et al.

(10) Patent No.: US 9,858,924 B2
(45) Date of Patent: Jan. 2, 2018

(54) VOICE PROCESSING APPARATUS AND VOICE PROCESSING METHOD

(71) Applicant: HONDA MOTOR CO., LTD., Tokyo (JP)

(72) Inventors: Kazuhiro Nakadai, Wako (JP); Keisuke Nakamura, Wako (JP); Shunichi Yamamoto, Wako (JP); Hiroshi Kondo, Wako (JP); Naoaki Sumida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/235,540

(22) Filed: Aug. 12, 2016

(65) Prior Publication Data

US 2017/0084271 A1 Mar. 23, 2017

(30) Foreign Application Priority Data

Sep. 17, 2015 (JP) ................................ 2015-183973

(51) Int. Cl.
| | | |
|---|---|---|
| *G10L 15/00* | (2013.01) | |
| *G10L 15/18* | (2013.01) | |
| *G10L 15/22* | (2006.01) | |
| *G06F 3/16* | (2006.01) | |
| *G10L 15/183* | (2013.01) | |
| *G10L 15/26* | (2006.01) | |

(52) U.S. Cl.
CPC ............ *G10L 15/1815* (2013.01); *G06F 3/16* (2013.01); *G10L 15/22* (2013.01); *G10L 15/183* (2013.01); *G10L 15/265* (2013.01); *G10L 2015/221* (2013.01); *G10L 2015/225* (2013.01)

(58) Field of Classification Search
CPC combination set(s) only.
See application file for complete search history.

(56) References Cited

U.S. PATENT DOCUMENTS 9,082,406 B2 * 7/2015 Shen .................... G06Q 30/016
9,575,963 B2 * 2/2017 Pasupalak ............... G06F 17/27

FOREIGN PATENT DOCUMENTS

JP 06-259090 9/1994

* cited by examiner

*Primary Examiner* — Vu B Hang
(74) *Attorney, Agent, or Firm* — Rankin, Hill & Clark LLP

(57) ABSTRACT

A voice processing apparatus includes: a sound input unit configured to acquire an audio signal; a voice recognition unit configured to perform voice recognition on the audio signal acquired by the sound input unit; an intention understanding unit configured to understand a user's intention on the basis of a recognition result recognized by the voice recognition unit; and a question unit configured to question the user on the basis of an understood result understood by the intention understanding unit. The question unit changes question content for the user according to the understood result and a predetermined priority.

4 Claims, 9 Drawing Sheets

FIG. 2

| PRIORITY | NUMBER OF QUESTIONS WHEN CORRESPONDING SCENARIO IS USED | TYPE OF INFORMATION TO BE CONFIRMED AND NUMBER OF PIECES OF INFORMATION TO BE CONFIRMED ONCE (UTTERANCE IS INTERRUPTED WHERE -> IS SHOWN) |
|---|---|---|
| 1 | 1 | (COMPANY TO WHICH VISITOR BELONGS) (VISITOR'S NAME) (DEPARTMENT TO WHICH PERSON WHO IS IN CHARGE BELONGS) (NAME OF PERSON WHO IS IN CHARGE) |
| 2 | 2 AND 3 | (COMPANY TO WHICH VISITOR BELONGS) -> (VISITOR'S NAME) -> (DEPARTMENT TO WHICH PERSON WHO IS IN CHARGE BELONGS) -> (NAME OF PERSON WHO IS IN CHARGE) |
| 3 | 4 | (DEPARTMENT TO WHICH PERSON WHO IS IN CHARGE BELONGS) -> (NAME OF PERSON WHO IS IN CHARGE) |

FIG. 3

ROBOT: "WELCOME"
ROBOT: "HOW CAN I HELP YOU?"  — R11

VISITOR: "MY NAME IS TANAKA FROM XXX, INC. I WOULD LIKE TO MEET SUZUKI IN THE YYY DEPARTMENT."  — H11

ROBOT: "ARE YOU [tɑnɑkə]FROM[ɛks-ɛks-ɛks, ɪŋk]? ARE YOU LOOKING FOR [səzukɑ]IN THE [zi-zi-zidɪpɑrtmənt]?"  — R12

VISITOR: "NO"  — H12

FIG. 4

R21 — ROBOT: "COULD YOU TELL ME THE NAME OF YOUR COMPANY?"
H21 — VISITOR: "IT IS XXX, INC."
R22 — ROBOT: "IS IT [εks-εks-εks, ıŋk]?"
H22 — VISITOR: "YES."
— C21

R23 — ROBOT: "WHAT'S YOUR NAME?"
H23 — VISITOR: "MY NAME IS TANAKA ."
R24 — ROBOT: "IS YOUR NAME [tanakə]?"
H24 — VISITOR: "YES."
— C22

R25 — ROBOT: "WHERE IS DEPARTMENT OF PERSON WHO IS IN CHARGE OF VISITING DESTINATION?"
H25 — VISITOR: "IT IS THE YYY DEPARTMENT."
R26 — ROBOT: "IS IT THE [zi-zi-zi dıpartmənt]?"
H26 — VISITOR: "NO."
— C23

R27 — ROBOT: "WITH WHOM WOULD YOU LIKE TO MEET HERE?"
H27 — VISITOR: "I WOULD LIKE TO MEET WITH SUZUKI."
R28 — ROBOT: "[səzuka]?"
H28 — VISITOR: "NO."
— C24

FIG. 5

R31 — ROBOT: "WITH WHOM WOULD YOU LIKE TO MEET?"

H31 — VISITOR: "I WOULD LIKE TO MEET WITH SUZUKI."

R32 — ROBOT: "[səzuki]? THERE ARE TWO PEOPLE NAMED [səzuki]. DOES [səzuki] BELONG TO THE YYY DEPARTMENT OR THE ZZZ DEPARTMENT?"

H32 — VISITOR: "THE YYY DEPARTMENT."

FIG. 8

| CANDIDATE | COMPANY TO WHICH VISITOR BELONGS | VISITOR'S NAME | DEPARTMENT OF VISITING DESTINATION | NAME OF PERSON WHO IS IN CHARGE OF VISITING DESTINATION |
|---|---|---|---|---|
| FIRST CANDIDATE | XXX | TANAKA (田中) | CCCC | SUZUKI (鈴木) |
| SECOND CANDIDATE | AAA | TAKENAKA (竹中) | YYY | |
| THIRD CANDIDATE | ZZZ | MANAKA (真中) | N/A | N/A |
| | N/A | N/A | | |

SELECT FROM THE FOLLOWING ITEMS g101
g111 g112 g113 g114 g121

FIG. 10

| READING | NAME OF PERSON WHO IS IN CHARGE | DEPARTMENT TO WHICH PERSON WHO IS IN CHARGE BELONGS | SEX | MAIN TASK | TELEPHONE NUMBER |
|---|---|---|---|---|---|
| SUZUKI (すずき) | JIRO SUZUKI (鈴木次郎) | FIRST ENGINEERING DEPARTMENT SECOND DIVISION | MALE | IN CHARGE OF CONTROL SYSTEMS | |
| | KEIKO SUZUKI (鈴木恵子) | THIRD ENGINEERING DEPARTMENT | FEMALE | IN CHARGE OF MECHANICAL SYSTEMS | |
| | AKIRA SUZUKI (涼木昭) | PRODUCTION ENGINEERING DEPARTMENT SIXTH DIVISION | MALE | IN CHARGE OF MECHANICAL-BASED PRODUCTION | |
| | RYOTA SUZUKI (鈴紀良太) | ACCOUNTING DEPARTMENT | MALE | ACCOUNTANT | |
| | NORIAKI YOSHIDA (吉田典明) | SECOND ENGINEERING DEPARTMENT FIRST DIVISION | MALE | IN CHARGE OF CONTROL SYSTEMS | |
| YOSHIDA (よしだ) | AKIKO YOSHIDA (吉田顕子) | FIRST ENGINEERING DEPARTMENT THIRD DIVISION | FEMALE | IN CHARGE OF SOFTWARE | |
| ... | ... | ... | ... | ... | ... |

FIG. 11

| PRIORITY | NUMBER OF QUESTIONS WHEN CORRESPONDING SCENARIO IS USED | TYPE OF INFORMATION TO BE CONFIRMED AND NUMBER OF PIECES OF INFORMATION TO BE CONFIRMED ONCE (SPEECH IS INTERRUPTED WHERE → IS SHOWN) | PRESENCE OF TOUCH PANEL INPUT USAGE |
|---|---|---|---|
| 1 | 1 | (COMPANY TO WHICH VISITOR BELONGS) (VISITOR'S NAME) (DEPARTMENT TO WHICH PERSON WHO IS IN CHARGE BELONGS) (NAME OF PERSON WHO IS IN CHARGE) | No |
| 2 | 2 AND 3 | (COMPANY TO WHICH VISITOR BELONGS) → (VISITOR'S NAME) → (DEPARTMENT TO WHICH PERSON WHO IS IN CHARGE BELONGS) → (NAME OF PERSON WHO IS IN CHARGE) | No, No, Yes, Yes |
| 3 | 4 | (DEPARTMENT TO WHICH PERSON WHO IS IN CHARGE BELONGS) → (NAME OF PERSON WHO IS IN CHARGE) | Yes, Yes |

FIG. 12 g201

SELECT FROM THE FOLLOWING ITEMS

| CANDIDATE | DEPARTMENT OF VISITING DESTINATION | NAME OF PERSON WHO IS IN CHARGE OF VISITING DESTINATION |
|---|---|---|
| FIRST CANDIDATE | FIRST ENGINEERING DEPARTMENT | JIRO SUZUKI (鈴木次郎) |
| SECOND CANDIDATE | THIRD ENGINEERING DEPARTMENT | KEIKO SUZUKI (鈴木恵子) |
| THIRD CANDIDATE | PRODUCTION ENGINEERING DEPARTMENT | SUZUKI (涼木) |
| N/A ||| g211
g212
g213

007
VOICE PROCESSING APPARATUS AND VOICE PROCESSING METHOD

CROSS-REFERENCE TO RELATED APPLICATION

Priority is claimed on Japanese Patent Application No. 2015-183973, filed Sep. 17, 2015, the content of which is incorporated herein by reference.

BACKGROUND OF THE INVENTION

Field of the Invention

The present invention relates to a voice processing apparatus and a voice processing method.

Description of Related Art

There is a demand for a voice interactive system in which voice recognition is performed on utterance content of a user and a process is performed using a voice recognition result. In recent years, humanoid robots have begun to be adopted for reception in, for example, companies, hotels, etc. Such reception robots merely output a guidance voice according to a scenario. Also, unmanned reception systems having a display unit or a touch panel have begun to be adopted for reception in companies, etc. For example, when an unmanned reception system is used for reception in a company, a visitor operates a touch panel so that a telephone call is put through to a person who is in charge at that location. In this case, for example, the visitor inputs or selects the name of the person who is in charge or the name of the department to which the person who is in charge belongs so that the unmanned reception system retrieves an extension number of the person who is in charge and puts a telephone call through to the person who is in charge.

For example, Japanese Unexamined Patent Application, First Publication No. H6-259090 (hereinafter referred to as Patent Literature 1) discloses a voice interactive system in which an input audio signal is recognized and an airline ticket or a train ticket is reserved or purchased or a hotel room is reserved using the recognized result. In the technique disclosed in Patent Literature 1, the input audio signal is recognized and a semantic representation is derived from it. Also, in the technique disclosed in Patent Literature 1, the derived semantic representation is subdivided into semantic groups, and the divided semantic groups are sequentially processed so that reservation or purchase process is performed. Note that the semantic representation is a phrase spoken by the user when reserving or purchasing an airline ticket or train ticket or reserving a hotel room.

SUMMARY OF THE INVENTION

However, in the technique disclosed in Patent Literature 1, even if a visitor repeatedly speaks when there is an error in the recognized content, the content is not correctly recognized in some cases. Thus, it may take a long time until the intention of the utterance content is accurately acquired.

Aspects related to the present invention were made in view of the above-described circumstances, and an object of the present invention is to provide a voice processing apparatus and a voice processing method capable of shortening a period of time taken to accurately acquire an intention of utterance content and accurately recognizing the intention.

In order to accomplish the object, the present invention adopts the following aspects.

(1) A voice processing apparatus related to an aspect of the present invention includes: a sound input unit configured to acquire an audio signal; a voice recognition unit configured to perform voice recognition on the audio signal acquired by the sound input unit; an intention understanding unit configured to understand a user's intention on the basis of a recognition result recognized by the voice recognition unit; and a question unit configured to question the user on the basis of an understood result understood by the intention understanding unit, wherein the question unit changes question content for the user according to the understood result and a predetermined priority.

(2) In the aspect of (1), the question unit may ask the user a confirmation question to confirm whether the understood result is correct and change the priority on the basis of an understood result of the confirmation question by the intention understanding unit.

(3) In the aspect of (1) or (2), the question unit may change the question content to question content for drawing out a necessary purpose word according to the priority.

(4) In the aspect of any one of (1) to (3), the priority may be based on the number of questions which have been asked to the user.

(5) In the aspect of any one of (1) to (4), the voice processing apparatus may further include: an image display unit, wherein candidates for content of the user's intention may be displayed on the image display unit on the basis of the understood result so that the user is able to select the candidates.

(6) In the aspect of (5), the question unit may extract candidates regarding utterance content of the user using N-Best retrieval through the voice recognition unit and display the extracted candidates on the image display unit.

(7) A voice processing method related to an aspect of the present invention includes: a sound input process of acquiring an audio signal; a voice recognition process of performing voice recognition on the audio signal acquired by the sound input process; an intention understanding process of understanding a user's intention on the basis of a recognition result recognized by the voice recognition process; and a question process of questioning the user on the basis of an understood result understood by the intention understanding process, wherein question content for the user is changed according to the understood result and a predetermined priority.

According to the aspect of (1) or (7), question content is changed according to a result of understanding an intention so that a time required to understand a user's intention can be shortened and the intention can be accurately understood.

In the aspect of (2), question content is changed according to whether the understood result is correct so that the user is asked about an item on which voice recognition cannot be correctly performed using, for example, a different question sentence according to the priority. As a result, in the aspect of (2), since an answer of the user is easily acquired, accuracy of the acquired recognition result of the audio signal can be improved.

In the aspect of (3), a question regarding a purpose word that needs to be acquired from the user is given so that the purpose word can be acquired. Note that in the case of a reception task, for example, the purpose word may be a company to which a visitor belongs, a visitor's name, a department to which a person in charge belongs, the name of a person in charge, etc. Thus, in the aspect of (3), voice recognition is performed on the acquired purpose word so that a recognition rate greater than that of voice recognition performed on a plurality of purpose words can be acquired.

In the aspect of (4), since a priority is set according to the number of questions, when the number of questions is increased, a question can be changed such that, for example, the user is asked a question regarding a purpose word that needs to be preferentially acquired, but is not asked a question regarding a purpose word with a low priority. Thus, in the aspect of (4), a burden on the user can be reduced, and, for example, minimum necessary information in a reception task can be efficiently acquired.

In the aspect of (5) or (6), a time of interaction between a robot and a visitor can be shortened and the response of the voice does not need to undergo voice recognition again. Thus, high recognition accuracy can be acquired.

BRIEF DESCRIPTION OF THE DRAWINGS

FIG. 2 is a view showing an example of a priority and scenarios related to the first embodiment.

FIG. 3 is a view showing an example of a conversation between a robot and a visitor based on a scenario when the priority is 1 related to the first embodiment.

FIG. 4 is a view showing an example of a conversation between the robot and the visitor based on a scenario when the priority is 2 related to the first embodiment.

FIG. 5 is a view showing an example of a conversation between the robot and the visitor based on a scenario when the priority is 3 related to the first embodiment.

FIG. 8 is a view showing an example of an image displayed on an image display unit related to the second embodiment.

FIG. 10 is a view showing an example of information associated with people who are in charge stored in a DB related to the first embodiment to a third embodiment.

FIG. 11 is a view showing an example of information stored in a scenario storage unit related to the third embodiment.

FIG. 12 is a view showing an example of an image displayed on an image display unit related to the third embodiment.

DETAILED DESCRIPTION OF THE INVENTION

Hereinafter, embodiments of the present invention will be described with reference to the drawings. Also, an example in which a robot includes a voice processing apparatus will be described in the following description.

[Overview of Invention]

An overview of the present invention will be first described.

In the present invention, when a humanoid robot (hereinafter also referred to simply as a robot) recognizes a visitor in reception, the robot begins a reception task. The robot first asks or utters a first question or utterance to the visitor requesting an utterance regarding a company to which the visitor belongs, the visitor's name, a department to which a person who is in charge at that location belongs, and the name of the person who is in charge according to a predetermined priority. Also, the robot understands a result of voice recognition of the speech of the visitor and receives confirmation of the visitor about whether the understood content is correct. When the understood content is correct, the robot transmits the fact that the visitor is visiting or puts a telephone call through to the person who is in charge. When the understood content is not correct, the robot asks a question different from the first question according to the predetermined priority to draw out a keyword from the utterance content of the caller, and changes content in response to the question. As described above, in the present invention, question content is changed for each number of questions so that the robot can appropriately ask a speaker about a keyword intended by the speaker.

First Embodiment

<Constitution of Voice Processing Apparatus 1>

Figure 1:
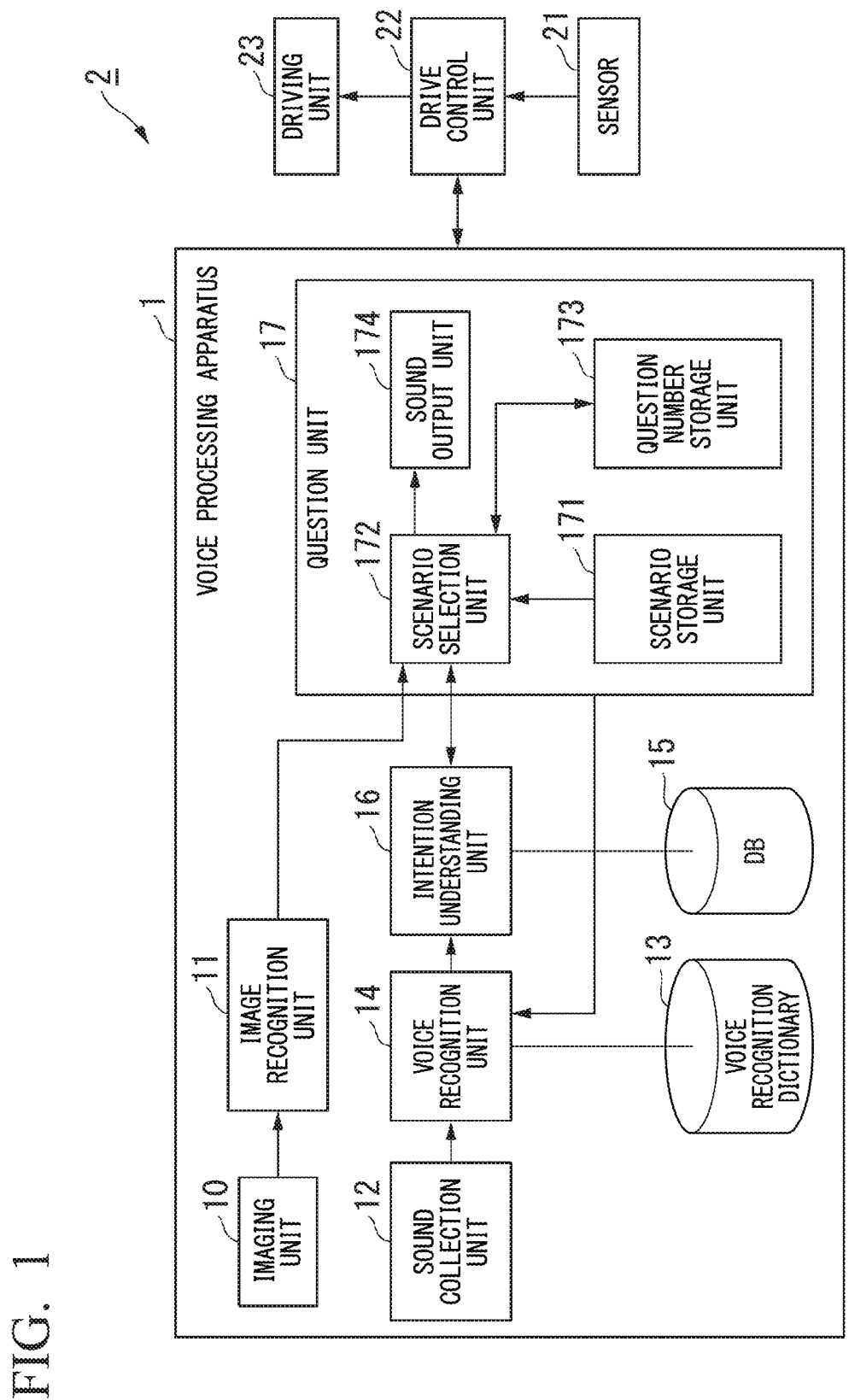
FIG. 1 is a block diagram showing a schematic constitution of a robot including a voice processing device related to a first embodiment.

FIG. 1 is a block diagram showing a schematic constitution of a robot 2 including a voice processing apparatus 1 related to this embodiment. As shown in FIG. 1, the robot 2 is configured to include the voice processing apparatus 1, a sensor 21, a drive control unit 22, and a driving unit 23. The voice processing apparatus 1 includes an imaging unit 10, an image recognition unit 11, a sound collection unit 12, a voice recognition dictionary 13, a voice recognition unit 14, a DB 15, an intention understanding unit 16, and a question unit 17. The question unit 17 includes a scenario storage unit 171, a scenario selection unit 172, a question number storage unit 173, and a sound output unit 174.

Note that a case in which the robot 2 performs reception when a person visiting a person who is in charge is received will be described in the following description.

The sensor 21 includes, for example, a force sensor or an attitude sensor attached to each driving unit 23 and outputs a detected detection result to the drive control unit 22.

The drive control unit 22 controls driving of each driving unit 23 according to the detection result output by the sensor 21. Also, the drive control unit 22 may control, for example, a portion of the robot 2 corresponding to a face to face a visitor on the basis of an image output by the voice processing apparatus 1.

The driving unit 23 includes, for example, a plurality of motors, a mechanism section, etc. attached to arms, legs, a head, etc. of the robot 2.

Note that the robot 2 further includes a power supply (not shown), etc.

The imaging unit 10 includes a charge coupled device (CCD) camera, a complementary metal oxide semiconductor (CMOS) camera, etc. attached to, for example, positions of the robot 2 corresponding to human eyes.

The imaging unit 10 outputs a captured image to the image recognition unit 11. Note that the imaging unit 10 may be configured to capture an image at every predetermined timing.

The image recognition unit 11 performs, for example, face recognition on an image output by the imaging unit 10 using a known image recognition technique. The image recognition unit 11 determines that the visitor is visiting when a human face can be recognized as being included in the image and generates information indicating that the visitor is visiting. The image recognition unit 11 outputs the generated information indicating that the visitor is visiting to the question unit 17.

Note that, in the embodiment, an example in which a visit of the visitor is recognized using the imaging unit 10 and the image recognition unit 11 will be described, but the visitor may be recognized using, for example, a motion sensor, etc.

The sound collection unit 12 includes at least one microphone attached to, for example, positions of the robot 2 corresponding to ears or a position thereof corresponding to a head. The sound collection unit 12 outputs each of collected audio signals to the voice recognition unit 14.

The voice recognition dictionary 13 stores, for example, an acoustic model, a language model, a word dictionary, etc. The acoustic model is a model based on feature amounts of sound, and the language model is a model regarding information on words and the arrangement thereof. The word dictionary is a dictionary based on a plurality of lexemes and is, for example, a large vocabulary word dictionary. The word dictionary includes company names and department names of visitors, department names of people who are in charge, and the people's names. Also, the voice recognition unit 14 may update the voice recognition dictionary 13 every time a company name of a visitor or a visitor's name which is not stored in the voice recognition dictionary 13 is acquired.

The audio signals output by the sound collection unit 12 and information indicating a speech interval of the robot 2 output by the question unit 17 are input to the voice recognition unit 14. The voice recognition unit 14 detects a speech interval of the audio signals other than the speech interval of the robot 2 among the audio signals output by the sound collection unit 12 and performs voice recognition on the audio signals of the detected speech interval by referring to the voice recognition dictionary 13 and using a known technique. The voice recognition unit 14 outputs the recognized recognition result to the intention understanding unit 16. The recognition result includes, for example, text information. The voice recognition unit 14 performs voice recognition using, for example, a technique disclosed in Japanese Unexamined Patent Application, First Publication No. 2015-64554, etc. The voice recognition unit 14 outputs a recognition candidate with the highest recognition score to the intention understanding unit 16 as a recognition result using, for example, B-Best. For example, in a case where the speech of the visitor is "My name is Tanaka from XXX, Inc. I would like to meet Suzuki in the YYY Department.", a recognition result is "maɪ neɪm ɪz tɑnɑkə frʌm ɛks-ɛks-ɛks, ɪŋ k aɪ wʊ d laɪk tu mit sə zuki ɪn ð ə waɪ-waɪ-waɪ dɪpɑrtmə nt".

The DB 15 stores a concept model. Here, the concept model is a model in which it is assumed that a kind of requirement is uttered on the basis of an utterance pattern of the visitor, and rules, a grammar, etc. used for understanding the meaning are described for every utterance pattern. The utterance patterns include, for example, an utterance of a visitor in reception when visiting a person who is in charge, an utterance for calling a taxi, an utterance requesting guidance to a meeting location, etc. In addition, names of people who are in charge are associated with departments to which the people who are in charge belong and telephone numbers, sexes, main task content, etc. of the people and are stored in the DB 15.

A recognition result output by the voice recognition unit 14 and information indicating a question sentence or a confirmation sentence output by the scenario selection unit 172 are input to the intention understanding unit 16. The intention understanding unit 16 understands the recognition result by referring to the DB 15 and the intention of utterance content on the basis of information input from the scenario selection unit 172 using a known technique. Here, the intention of the utterance content includes reception when visiting a person who is in charge, calling a taxi, guidance to a meeting place, etc. The intention understanding unit 16 extracts a corresponding person who is in charge and information associated with the corresponding person who is in charge (a department, sex, telephone number, and main task) from the DB 15 according to a priority when an utterance pattern corresponds to reception when visiting the person who is in charge. The intention understanding unit 16 outputs information indicating the voice recognition result and the understood intention of the utterance content to the scenario selection unit 172 as an understood result.

The scenario storage unit 171 stores scenarios of answers for the visitor according to a priority. Also, the scenario storage unit 171 stores a relationship between the number of questions and the priority. Note that an example of information stored in the scenario storage unit 171 will be described below.

The scenario selection unit 172 adds 1 to the number of questions when information indicating that a visitor is visiting is input from the image recognition unit 11. The scenario selection unit 172 reads the number of questions stored in the question number storage unit 173 and determines a priority according to the read number of questions.

The scenario selection unit 172 selects a scenario to utter to the visitor from the scenario storage unit 171 on the basis of the understood result output by the intention understanding unit 16 and the priority. The scenario selection unit 172 converts the selected scenario into an audio signal and outputs the converted audio signal to the sound output unit 174. Also, the scenario selection unit 172 asks a question to confirm the understanding content using the scenario at a timing according to the priority and determines whether the second question and subsequent questions are asked according to the response of the visitor to the question to determine whether the understood result output by the intention understanding unit 16 is correct. The scenario selection unit 172 outputs information indicating a question sentence or a confirmation sentence for the visitor to the intention understanding unit 16. The scenario selection unit 172 stores the number of questions that the same visitor has been asked in the question number storage unit 173. The scenario selection unit 172 resets the number of questions to 0 when a series of interactions with the same visitor is completed. Note that an example of the priority and the scenario will be described below.

The question number storage unit 173 stores the number of questions that the same visitor has been asked. Note that an initial value of the number of questions is, for example, 0.

The sound output unit 174 includes a speaker attached to, for example, a position of the robot 2 corresponding to a mouth. The sound output unit 174 emits an audio signal output by the scenario selection unit 172.

<Example of Priority and Scenarios>

Next, an example of a priority and scenarios will be described.

FIG. 2 is a view showing an example of a priority and scenarios related to this embodiment. As shown in FIG. 2, in each scenario, the number of questions when a corresponding scenario is used, a timing at which speech is interrupted, and a timing at which an understood result is confirmed are associated with a priority and are stored in the scenario storage unit 171.

The priority is 1 when the number of questions is 1, the priority is 2 when the number of questions is 2 or 3, and the priority is 3 when the number of questions is 4. In FIG. 2, a symbol "→" indicates a timing at which speech is interrupted and a timing at which an understood result is confirmed. Note that the example shown in FIG. 2 is an example and the present invention is not limited thereto. For example, the priority may be 2 when the number of questions is 2 and the priority may be 3 when the number of questions is 3. Also, the priority may be 2 or more and 4 or more.

In the priority of 1, a scenario of requesting a visitor to utter "a company to which the visitor belongs, the visitor's name, a department to which a person who is in charge belongs, and the name of the person who is in charge," and a scenario in which a result of understanding "the company to which the visitor belongs, the visitor's name, the department to which the person who is in charge belongs, and the name of the person who is in charge" is confirmed are set.

FIG. 3 is a view showing an example of a conversation between the robot 2 and a visitor based on a scenario when a priority is 1 related to the embodiment. In FIG. 3, R11 and R12 are utterances of the robot 2 based on the scenario, and H11 and H12 are utterances of the visitor (a customer).

Since the number of questions is 1, the scenario selection unit 172 sets the priority to 1 and reads a scenario corresponding to the priority of 1 from the scenario storage unit 171.

As shown in FIG. 3, the robot 2 utters the utterance R11 corresponding to the read scenario through the sound output unit 174 to request the visitor to utter four items, i.e., "the company to which the visitor belongs, the visitor's name, the department to which the person who is in charge belongs, and the name of the person who is in charge."

The visitor utters the utterance H11 in response to the utterance R11.

The robot 2 receives the utterance H11 and performs voice recognition on the received utterance H11. The voice recognition unit 14 acquires text information, i.e., of "My name is Tanaka from XXX, Inc. I would like to meet Suzuki-sama in the YYY Department" as a result of the voice recognition. Also, the intention understanding unit 16 understands content of the utterance H11 of the visitor by referring to the DB 15 and understands that the company to which the visitor belongs is "[eks-eks-eks, iŋ k]", the visitor's name is "[tanakə ]", the department to which the person who is in charge belongs is "[zi-zi-zi dɪpartmə nt]", and the name of the person who is in charge is "[sə zuka]" as an understood result. Also, the scenario selection unit 172 utters the utterance R12 for confirming the understood result through the sound output unit 174 according to the scenario corresponding to the priority of 1 to confirm whether the result of understanding the utterance of the visitor is correct. The scenario selection unit 172 generates an audio signal by embedding the understood result output by the intention understanding unit 16, for example, in a model of a scenario stored in the scenario storage unit 171.

The visitor utters the utterance H12 in response to the utterance R12. In other words, since the recognized and understood result of the voice processing apparatus 1 is wrong, the visitor utters an utterance indicating that it is wrong.

The scenario selection unit 172 adds 1 to the number of questions because the understood result is incorrect after the conversation illustrated in FIG. 3 ends.

An example in which the scenario selection unit 172 determines whether the understood result is correct on the basis of the understood result output by the intention understanding unit 16 has been described, but the present invention is not limited thereto. For example, the image recognition unit 11 may perform image recognition on an acquired image using a known technique to recognize if the visitor nods or tilts his or her head, etc. and output the recognized action recognition result to the scenario selection unit 172. In this case, the scenario selection unit 172 may determine whether the understood result is correct on the basis of the output action recognition result output by the image recognition unit 11.

Referring again to FIG. 2, the priority and the scenario will continue to be described.

In the priority of 2, a scenario in which a visitor is requested to utter items, i.e., "a company to which the visitor belongs," "the visitor's name," "a department to which a person who is in charge belongs," and "the name of the person who is in charge" one by one and a scenario in which results of sequentially understanding each of "the company to which the visitor belongs," "the visitor's name," "the department to which the person who is in charge belongs," and "the name of the person who is in charge" are sequentially confirmed are set.

FIG. 4 is a view showing an example of a conversation between the robot 2 and a visitor based on a scenario when the priority related to the embodiment is 2. In FIG. 4, R21 to R28 are utterances of the robot 2 based on a scenario, and H21 to H28 are utterances of the visitor. Also, C21 to C24 indicate groups of utterances.

As shown in FIG. 4, the scenario selection unit 172 first reads the scenario in which the visitor is requested to utter "the company to which the visitor belongs" according to a scenario corresponding to the priority of 2 and gives the utterance R21 based on the read scenario through the sound output unit 174.

The visitor utters the utterance H 21 in response to the utterance R21.

Also, the scenario selection unit 172 utters the utterance R22 according the scenario corresponding to the priority of 2 using the result obtained by understanding the utterance H21 through the sound output unit 174 to confirm whether the result of understanding the utterance of the visitor is correct. Secondly, recognition, understanding, and confirmation are performed for each item in this way.

The visitor utters the utterance H22 in response to the utterance R22. Note that the scenario selection unit 172 continues the conversation from C22 onward even if the utterance H22 which is the confirmed response is "No."

Hereinafter, the voice processing apparatus 1 request the visitor to utter "the visitor's name," "the department to which the person who is in charge belongs," and "the name of the person who is in charge" one by one and confirms the understood result for each item.

The scenario selection unit 172 adds 1 to the number of questions because the understood result is incorrect after the conversation of C21 to C24 illustrated in FIG. 4 ends.

The intention understanding unit 16 understands that items in which the voice recognition result is wrong are "the department to which the person who is in charge belongs" and "the name of the person in charge" as a result obtained through the second question. Also, the intention understanding unit 16 outputs information indicating that the third question is asked to the scenario selection unit 172. In this case, the scenario selection unit 172 performs the conversation of C23 and C24 of "the department to which the person who is in charge belongs" and "the name of the person who is in charge" in which the voice recognition result is wrong. The scenario selection unit 172 may select different scenarios on the second and third times, that is, ask different questions on the second and third times when a plurality of scenarios with the same priority are stored in the scenario storage unit 171.

Referring again to FIG. 2, the priority and the scenario will continue to be described.

In the priority of 3, a scenario in which the visitor is requested to utter "a department to which a person who is in charge belongs" and "the name of the person who is in charge" one by one and a scenario in which results of sequentially understanding "the department to which the person who is in charge belongs" and "the name of the person who is in charge" are sequentially confirmed are set. As described above, an order of priority to contact the person who is in charge is high even if recognized/understood results of the visitor's name and the company to which the visitor belongs are wrong so that the visitor is asked only about "the department to which the person who is in charge belongs" and "the name of the person who is in charge," and the responses are received when the priority is 3. For example, in the case of a visitor who visits a company for the first time, the visitor's name is not stored in the DB 15 and thus may not be able to correctly undergo voice recognition. Even in this case, for example, since it is preference to put a telephone call through, the visitor is not asked questions about the company name of the visitor and the visitor's name again.

FIG. 5 is a view showing an example of a conversation between the robot 2 and a visitor based on a scenario when the priority is 3 related to the embodiment. In FIG. 5, R31 and R32 are utterances of the robot 2 based on the scenario, and H31 and H32 are utterances of the visitor.

In the example illustrated in FIG. 5, since the visitor utters the utterance H31 related to a name of a person who is in charge in response to the utterance R31, the intention understanding unit 16 understands that the name of the person who is in charge is included among nouns included in the utterance H31. The example illustrated in FIG. 5 is an example in which the name of the person who is in charge is recognized to be "[sə zuki]" by the voice recognition unit 14. Also, the intention understanding unit 16 understands that the person who is in charge corresponding to "[sə zuki]" is "Suzuki" by referring to the DB 15. Next, the intention understanding unit 16 retrieves the DB 15 and extracts a department to which "Suzuki" belongs when there are a plurality of people named "Suzuki" in the DB 15.

In the example illustrated in FIG. 5, since there are two corresponding people named "Suzuki" who are in charge, the intention understanding unit 16 outputs information (departments to which the people who are in charge and names of the people who are in charge) associated with the two corresponding people who are in charge to the scenario selection unit 172. The scenario selection unit 172 selects a scenario of the utterance R31 of asking about a department to which the person who is in charge belongs according to a scenario corresponding to the priority of 3.

The example illustrated in FIG. 5 is an example in which there are people who are in charge with the same family name in different departments. However, when there are a plurality of people who are in charge with the same family name in the same department, if the relevant people are a male and a female, a scenario of asking whether the visitor is looking for a man or a woman may be selected, a scenario of asking about a full name of the person who is in charge may be selected, or a scenario of asking about task content of which the person who is in charge is primarily in charge may be selected.

As described above, in the case of the priority of 1, the voice processing apparatus 1 recognizes four items (a company to which the visitor belongs, the visitor's name, a department to which a person who is in charge belongs, and the name of the person who is in charge) based on a single utterance. For this reason, if a recognition rate for one item is 90%, a probability of all four of the items being correctly recognized is about 66% (=0.9^4).

On the other hand, in the cases of the priorities of 2 and 3, the voice processing apparatus 1 requests an utterance regarding one of the items (one of the company to which the visitor belongs, the visitor's name, the department to which the person who is in charge belongs, and the name of the person who is in charge) and recognizes based on the utterance including the one item. For this reason, if a recognition rate for the one item is 90%, probabilities of each of the four items being correctly recognized are about 90%. In other words, the items are recognized one by one so that recognition rates of all four of the items can be improved. Also, since only an item for which a recognition result is incorrect is asked about (that is, a question different from the previous question is asked), recognition of all of the items does not need to be repeated and thus a time required for the recognition can be shortened.

<Processing Procedure of Voice Processing Apparatus 1>

Next, a processing procedure of the voice processing apparatus 1 will be described.

Figure 6:
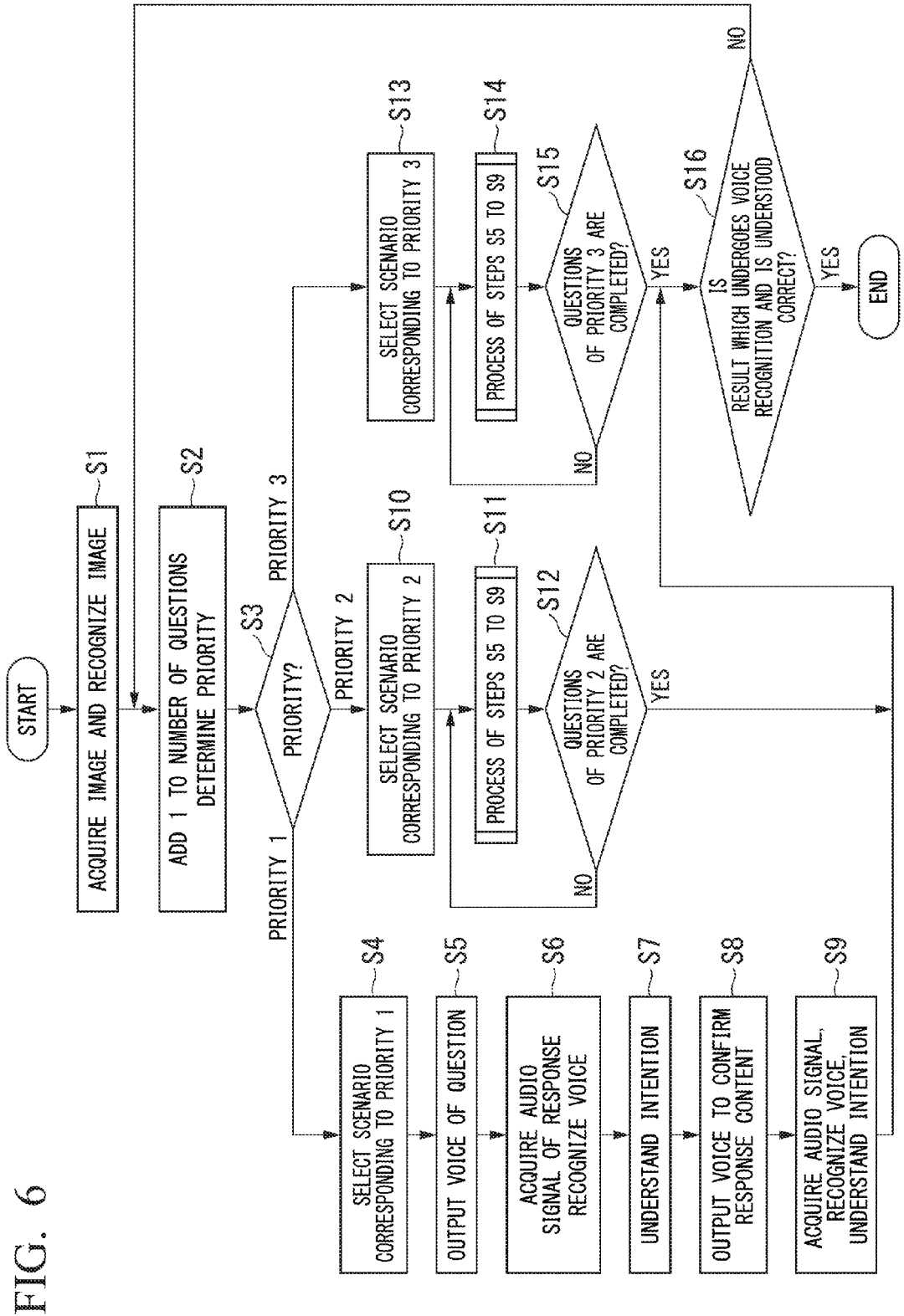
FIG. 6 is a flowchart of a process of the voice processing apparatus related to the first embodiment.

FIG. 6 is a flowchart of a process of the voice processing apparatus 1 related to an embodiment. In FIG. 6, an example of priorities of 1 to 3 will be described.

(Step S1) An image recognition unit 11 performs, for example, face recognition on an image output by an imaging unit 10 using a known image recognition technique. Subsequently, the image recognition unit 11 determines that a visitor is visiting when a human face has been recognized to be included in the image and generates information indicating that the visitor is visiting.

(Step S2) The scenario selection unit 172 adds 1 to the number of questions when the information indicating that the visitor is visiting is input from the image recognition unit 11. Subsequently, the scenario selection unit 172 determines a priority as 1 by referring to the question number storage unit 173.

(Step S3) The scenario selection unit 172 determines whether the priority is 1, 2, or 3. The process of the scenario selection unit 172 proceeds to Step S4 when the priority is determined to be 1 (Step S3; priority 1), proceeds to Step S10 when the priority is determined to be 2 (Step S3; priority 2), and proceeds to Step S13 when the priority is determined to be 3 (Step S3; priority 3).

(Step S4) The scenario selection unit 172 selects a scenario in which an utterance is uttered to the visitor according to priority 1 from the scenario storage unit 171.

(Step S5) The scenario selection unit 172 converts the selected scenario into an audio signal and emits the converted audio signal from the sound output unit 174 so that the visitor is asked a question.

(Step S6) The voice recognition unit 14 acquires an audio signal picked up by the sound collection unit 12 as a response to the question the visitor was asked. Subsequently, the voice recognition unit 14 performs voice recognition on the acquired audio signal by referring to the voice recognition dictionary 13.

(Step S7) The intention understanding unit 16 understands the intention of utterance content of a recognition result output by the voice recognition unit 14 by referring to the DB 15.

(Step S8) The scenario selection unit 172 selects a scenario for confirming whether a result of recognizing and understanding the utterance of the visitor is correct according to priority 1. Subsequently, the scenario selection unit 172 converts the selected scenario into an audio signal and outputs the converted audio signal from the sound output unit 174 so that the visitor is asked a confirmation question.

(Step S9) The voice recognition unit 14 acquires an audio signal picked up by the sound collection unit 12 as a response to the confirmation question the visitor was asked. Subsequently, the voice recognition unit 14 performs voice recognition on the acquired audio signal by referring to the voice recognition dictionary 13. Subsequently, the intention understanding unit 16 understands the intention of the utterance content of the recognition result output by the voice recognition unit 14 by referring to the DB 15. Subsequently, the process of the intention understanding unit 16 proceeds to Step S16.

(Step S10) The scenario selection unit 172 selects a scenario in which an utterance is uttered to the visitor according to priority 2 from the scenario storage unit 171.

(Step S11) The voice recognition unit 14, the intention understanding unit 16, and the scenario selection unit 172 perform the process of Step S5 to Step S9.

(Step S12) The scenario selection unit 172 determines whether questions of a scenario corresponding to priority 2 are all completed. The process of the scenario selection unit 172 proceeds to Step S16 when all of the questions of the scenario corresponding to priority 2 are determined to be completed (Step S12; YES) and returns to Step S11 when all of the questions of the scenario corresponding to priority 2 are not determined to be completed (Step S12; NO).

(Step S13) The scenario selection unit 172 selects a scenario in which an utterance is uttered to the visitor according to priority 3 from the scenario storage unit 171.

(Step S14) The voice recognition unit 14, the intention understanding unit 16, and the scenario selection unit 172 perform the process of Step S5 to Step S9.

(Step S15) The scenario selection unit 172 determines whether questions of a scenario corresponding to priority 3 are all completed. The process of the scenario selection unit 172 proceeds to Step S16 when all of the questions of the scenario corresponding to priority 3 are determined to be completed (Step S15; YES) and returns to Step S14 when all of the questions of the scenario corresponding to priority 3 are not determined to be completed (Step S15; NO).

(Step S16) The intention understanding unit 16 determines whether a result which undergoes voice recognition in Step S5 and is understood in Step S6 is correct on the basis of the result which undergoes voice recognition and is understood in Step S8. The process of the intention understanding unit 16 ends when the result which undergoes voice recognition and is understood is determined to be correct (Step S16; YES) and returns to Step S2 when the result which undergoes voice recognition and is understood is not determined to correct (Step S16; NO).

Here, the process of the voice processing apparatus 1 ends.

As described above, the voice processing apparatus 1 in the embodiment includes a sound input unit (the sound collection unit 12) configured to acquire an audio signal, the voice recognition unit 14 configured to perform voice recognition on the audio signal acquired through the sound input unit, the intention understanding unit 16 configured to understand the intention of a user on the basis of a recognition result recognized through the voice recognition unit, and a question unit 17 configured to ask the user a question on the basis of an understood result understood through the intention understanding unit, in which the question unit changes question content for the user according to the understood result and a predetermined priority.

With such a constitution, according to the embodiment, the question content is changed according to the result of understanding the intention so that a time required for understanding the intention of the user can be shortened and the intention can be accurately understood.

Also, in the voice processing apparatus 1 in the embodiment, the question unit 17 asks the user a confirmation question to confirm whether the understood result is correct and changes a priority on the basis of a result in which the confirmation result is understood by the intention understanding unit.

With such a constitution, according to the embodiment, the question content is changed according to whether the understood result is correct so that the user is asked a question regarding an item for which voice recognition is not correct using a scenario according to a priority, for example, a different question sentence. As a result, according to the embodiment, since a response of the user is easily acquired, accuracy of a recognition result of the acquired audio signal can be improved.

Also, in the voice processing apparatus 1 in the embodiment, the question unit 17 changes the question content to question content which draws out a necessary purpose word according to the priority.

With such a constitution, according to the embodiment, a question related to a purpose word that needs to be acquired from the user is asked so that the purpose word can be acquired. The purpose word includes a company to which a visitor belongs, the visitor's name, a department to which a person who is in charge belongs, the name of the person who is in charge, etc. Thus, according to the embodiment, the acquired purpose word undergoes voice recognition so that a recognition rate higher than that of the voice recognition performed on a plurality of purpose words can be acquired.

Also, in the voice processing apparatus 1 in the embodiment, a priority is based on the number of questions that has been asked to the user.

With such a constitution, according to the embodiment, since the priority is set according to the number of questions, when the number of questions is increased, a question can be changed such that, for example, a question regarding a purpose word that needs to be preferentially acquired is asked, but a question regarding a purpose word with a low priority is not asked. Thus, a burden on the user can be reduced, and, for example, minimum necessary information in a reception task can be efficiently acquired.

The example of timings illustrated in FIG. 2 is an example, and timings at which confirmation is sought from the visitor are not limited thereto. Also, an order in which the questions are asked is not limited thereto either. For example, when the priority is 2, the company to which the visitor belongs and the visitor's name are continuously asked about and acquired, and the department to which the person who is in charge belongs and the name of the person who is in charge may be asked about and acquired for every item. The department to which the person who is in charge belongs and the name of the person who is in charge may be asked about and acquired before the company to which the visitor belongs and the visitor's name. Also, a method of asking questions is not limited to a method of asking about each item either, and as shown in FIG. 5, the name of the person who is in charge may be asked about and then the department to which the person who is in charge belongs may be asked about from candidates on the basis of the acquired response.

At least one of the voice recognition dictionary 13, the DB 15, and the scenario storage unit 171 may be connected to the voice processing apparatus 1 over a network (not shown). Also, at least one of update, addition, and modification may be performed on information stored in the voice recognition dictionary 13, the DB 15, and the scenario storage unit 171 using the voice recognition unit 14, the intention understanding unit 16, and the scenario selection unit 172.

Second Embodiment

In the first embodiment, an example in which it is confirmed using voice whether an understood result regarding utterance content uttered by the visitor is correct has been described. In the embodiment, an example in which an understood result is presented on an image display unit and confirmation is received from a visitor or a plurality of candidates of a recognition result or an understood result are presented when there are the plurality of candidates and the understood result is selected by the visitor will be described.

Figure 7:
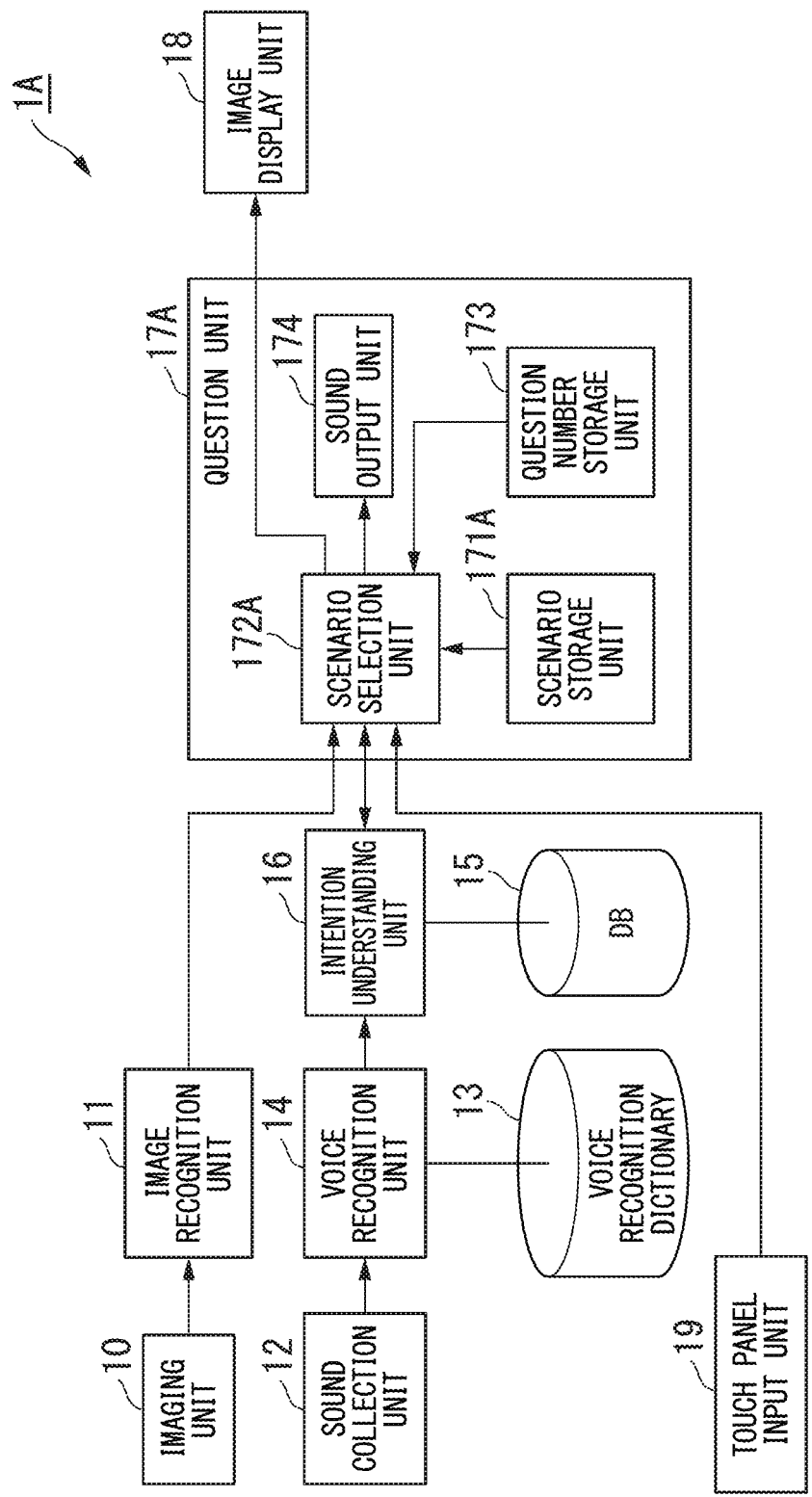
FIG. 7 is a block diagram showing a schematic constitution of a voice processing apparatus related to a second embodiment.

FIG. 7 is a block diagram showing a schematic constitution of a voice processing apparatus 1A related to the embodiment. As shown in FIG. 7, the voice processing apparatus 1A includes the imaging unit 10, the image recognition unit 11, the sound collection unit 12, the voice recognition dictionary 13, the voice recognition unit 14, the DB 15, the intention understanding unit 16, a question unit 17A, an image display unit 18, and a touch panel input unit 19. The question unit 17A includes a scenario storage unit 171A, a scenario selection unit 172A, the question number storage unit 173, and the sound output unit 174. Note that, as in the first embodiment, an example in which the voice processing apparatus 1A is mounted on the robot 2 will be described. Also, the same reference numerals are used for functional units having the same functions as those of the voice processing apparatus 1, and description thereof is omitted.

The scenario selection unit 172A adds 1 to the number of questions when information indicating that the visitor is visiting is input from the image recognition unit 11. The scenario selection unit 172A reads the number of questions stored in the question number storage unit 173 and determines a priority according to the read number of questions. The scenario selection unit 172A selects a scenario of utterances for the visitor from the scenario storage unit 171 on the basis of an understood result output by the intention understanding unit 16 and the priority. The scenario selection unit 172A converts the selected scenario into an audio signal and outputs the converted audio signal to the sound output unit 174. Also, the scenario selection unit 172A generates an image in which a question for confirming understood content is asked and displays the generated image on the image display unit 18 to determine whether the understood result output by the intention understanding unit 16 is correct. The scenario selection unit 172A determines whether the second question and subsequent questions are asked according to a response of the visitor output by the touch panel input unit 19 in response to the question. The scenario selection unit 172A stores the number of questions that the same visitor has been asked in the question number storage unit 173. Also, when there are a plurality of candidates for results which undergo voice recognition or when there are a plurality of candidates for results which are understood, the scenario selection unit 172A acquires an operation result obtained by the visitor operating the touch panel input unit 19 and selecting one candidate from the plurality of candidates on the basis of the acquired operation result. The scenario selection unit 172A resets the number of questions to 0 when a series of interactions with the same visitor is completed.

The image display unit 18 includes, for example, a liquid crystal panel. The image display unit 18 displays an image output by the question unit 17A. The question unit 17A and the image display unit 18 are connected to each other in a wired or wireless manner. Also, the image display unit 18 may be, for example, a mobile phone such as a smartphone, a tablet terminal, etc.

The touch panel input unit 19 includes a touch panel sensor provided on an upper surface of the image display unit 18. The touch panel input unit 19 receives an operation of the visitor and outputs information indicating the received operation result to the scenario selection unit 172A.

<Example of Image Displayed on Image Display Unit 18>

Next, an example of an image displayed on the image display unit 18 will be described.

FIG. 8 is a view showing an example of an image g101 displayed on the image display unit 18 related to the embodiment. Note that the example illustrated in FIG. 8 is an example in which an understood result for each of four items (a company to which a visitor belongs, the visitor's name, a department to which a person who is in charge belongs, and the name of the person who is in charge) is displayed on the image display unit 18, and the visitor operates the touch panel input unit 19 and confirms each of them. A button is assigned to each region of each column (here, empty columns are excluded) in a region surrounded by reference numeral g121. The image g101 shown in FIG. 8 is displayed when a response of the visitor undergoes voice recognition and is understood, for example, if priority is 1.

A region surrounded by a chain line g111 includes an image displayed on the image display unit 18 to confirm the company to which the visitor belongs. Also, the region surrounded by the chain line gill corresponds to an example in which the voice recognition unit 14 selects the top three using N-Best retrieval based on a recognized result with respect to an audio signal indicating the company to which the visitor belongs, and the intention understanding unit 16 selects terms ("XXX," "AAA," and "ZZZ") corresponding to the selected top three. The visitor touches and selects an image of a button corresponding to a candidate of the correct answer when the correct answer is among candidates "XXX," "AAA," and "ZZZ" and selects "N/A" when the correct answer is not included. Note that the scenario selection unit 172A may display a software keyboard on the image display unit 18 for the visitor to operate the touch panel input unit 19 and input the company to which the visitor belongs when the correct answer is not included. Alternatively, the scenario selection unit 172A may as the visitor about the company to which the visitor belongs again using an audio signal.

A region surrounded by a chain line g112 includes an image displayed on the image display unit 18 to confirm the visitor's name. Also, the region surrounded by the chain line g112 corresponds to an example in which the voice recognition unit 14 selects the top three using the N-Best retrieval based on a recognized result with respect to an audio signal indicating the visitor's name, and the intention understanding unit 16 selects terms ("Tanaka (田中)," "Takenaka (竹中)," and "Manaka (真中)") corresponding to the selected top three.

A region surrounded by a chain line g113 includes an image displayed on the image display unit 18 to confirm a department to which a person who is in charge at that location belongs. Also, the region surrounded by the chain line g113 corresponds to an example in which there are two corresponding terms as a result of recognizing an audio signal indicating the department to which the person who is in charge belongs and an example in which the intention understanding unit 16 selects terms ("CCCC" and "YYY") corresponding to the top two selected by the N-Best retrieval.

A region surrounded by a chain line g114 includes an image displayed on the image display unit 18 to confirm a name of the person who is in charge at that location. Also, the region surrounded by the chain line g114 corresponds to an example in which one candidate is acquired as a result of recognizing an audio signal of the name of the person who is in charge and an example in which the intention understanding unit 16 selects a term ("Suzuki (鈴木)") corresponding to the selected one candidate.

Note that the scenario selection unit 172A may display a confirmation screen shown in FIG. 8 for every priority. Also, if the priority is 1 and the display of FIG. 8 is performed, the scenario selection unit 172A asks only about the item of N/A using an audio signal when the priority is 2 for every item. Alternatively, the scenario selection unit 172A may display an image of the software keyboard on the image display unit 18 only with regard to the item of N/A when the priority is 2 and acquire an input serving as a result obtained by the visitor operating the touch panel input unit 19.

The scenario selection unit 172A may generate an image including buttons "Yes" and "No" which are responses for confirmation from the visitor and display the generated image on the image display unit 18. In this case, the voice processing apparatus 1A asks a question regarding the recognized and understood result using an audio signal, and an image including the buttons "Yes" and "No" is displayed on the image display unit 18 in Step S9 of FIG. 6 so that it may be determined whether the recognized content is correct according to an input result output by the touch panel input unit 19.

<Processing Procedure of Voice Processing Apparatus 1A>

Next, a processing procedure of the voice processing apparatus 1A will be described.

Figure 9:
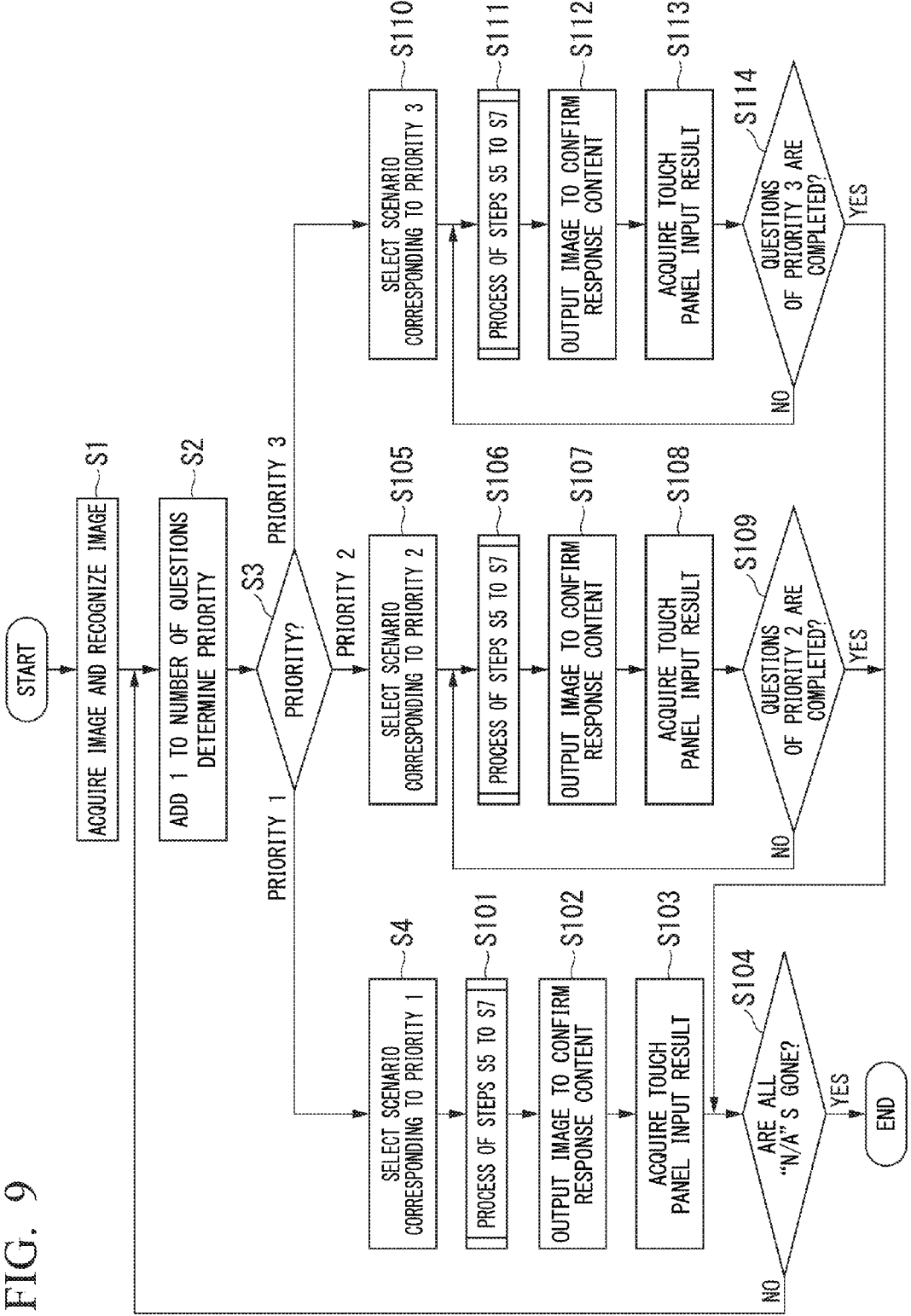
FIG. 9 is a flowchart of a process of the voice processing apparatus related to the second embodiment.

FIG. 9 is a flowchart of a process of the voice processing apparatus 1A related to the embodiment. In FIG. 9, an example in which priority is 1 to 3 will be described. (Steps S1 to S3) The voice processing apparatus 1A performs the process of Steps S1 and S2. The scenario selection unit 172A determines whether the priority is 1, 2, or 3. The process of the scenario selection unit 172A proceeds to Step S4 when the priority is determined to be 1 (Step S3; priority 1), proceeds to Step S105 when the priority is determined to be 2 (Step S3; priority 2), and proceeds to Step S110 when the priority is determined to be 3 (Step S3; priority 3).

(Step S4) The scenario selection unit 172A proceeds to the process of Step S101 after the process of Step S4 ends.

(Step S101) The voice processing apparatus 1A performs the process of Steps S5 to S7 and proceeds to the process of Step S102 after the process ends.

(Step S102) The scenario selection unit 172A generates, for example, an image in which response content is confirmed for each item illustrated in FIG. 8 on the basis of the understood result output by the intention understanding unit 16 and outputs the generated image to the image display unit 18. Subsequently, the image display unit 18 displays an image output by the scenario selection unit 172A.

(Step S103) The touch panel input unit 19 acquires a result obtained by operating, by the visitor, it.

(Step S104) The scenario selection unit 172A determines whether information indicating "N/A" is included in a result output by the touch panel input unit 19. The scenario selection unit 172A extracts information indicating an item including "N/A," and the process thereof returns to Step S2 when the information indicating "N/A" is determined to be included (Step S104; NO). The process of the scenario selection unit 172A ends when the information indicating "N/A" is not determined to be included (Step S104; YES).

(Step S105) The scenario selection unit 172A selects a scenario in which an utterance is uttered to the visitor according to priority 2 from the scenario storage unit 171. Subsequently, the scenario selection unit 172A selects only a scenario of an item in which the information indicating "N/A" is included in the selected scenario.

(Step S106) The voice processing apparatus 1A performs the process of Steps S5 to S7 on the scenario of the item including the information indicating "N/A."

(Step S107) The scenario selection unit 172A generates an image in which response content is confirmed for each item including the information indicating "N/A" on the basis of the understood result output by the intention understanding unit 16 and outputs the generated image to the image display unit 18 for each item. Subsequently, the image display unit 18 displays an image output by the scenario selection unit 172A. (Step S108) The touch panel input unit 19 acquires a result obtained by operating, by the visitor, it.

(Step S109) The scenario selection unit 172A determines whether questions regarding an item including information indicating "N/A" corresponding to priority 2 are all completed. The scenario selection unit 172A proceeds to the process of Step S104 when it is determined that all of the questions regarding the item including the information indicating "N/A" corresponding to priority 2 are completed (Step S109; YES) and returns to the process of Step S106 when it is not determined that all of the questions regarding the item including the information indicating "N/A" corresponding to priority 2 are completed (Step S109; NO).

(Step S110) The scenario selection unit 172A selects a scenario in which an utterance is uttered to the visitor according to priority 3 from the scenario storage unit 171. Subsequently, the scenario selection unit 172A extracts only the scenario of the item in which the information indicating "N/A" is included in the selected scenario.

(Step S111) The voice processing apparatus 1A performs the process of Steps S5 to S7 on the scenario of the item including the information indicating "N/A."

(Step S112) The scenario selection unit 172A generates an image in which response content is confirmed for each item including the information indicating "N/A" on the basis of the understood result output by the intention understanding unit 16 and outputs the generated image to the image display unit 18 for each item. Subsequently, the image display unit 18 displays the image output by the scenario selection unit 172A for each item.

(Step S113) The touch panel input unit 19 acquires a result obtained by operating, by the visitor, it.

(Step S114) The scenario selection unit 172A determines whether questions regarding an item including information indicating "N/A" corresponding to priority 3 are all completed. The scenario selection unit 172A proceeds to the process of Step S104 when it is determined that all of the questions regarding the item including the information indicating "N/A" corresponding to priority 3 are completed (Step S114; YES) and returns to the process of Step S111 when it is not determined that all of the questions regarding the item including the information indicating "N/A" corresponding to priority 3 are completed (Step S114; NO).

Here, the process of the voice processing apparatus 1A ends.

The example illustrated in FIG. 9 is an example in which the question and the conformation are performed at a timing for each item when the priority is 2 or 3, but a confirmation screen may be displayed when all the questions regarding the item including the information indicating "N/A" in each of the priorities are completed.

As described above, the voice processing apparatus 1A in the embodiment includes the image display unit 18 and displays a candidate for the intended content of the user on the image display unit on the basis of the understood result to enable the user to select the candidate.

In addition, in the voice processing apparatus 1A in the embodiment, the question unit 17A extracts a candidate regarding utterance content of the user using the N-Best retrieval through the voice recognition unit 14 and displays the extracted candidate on the image display unit 18.

With such a constitution, according to the embodiment, since the voice processing apparatus 1A displays a candidate for each item on the image display unit 18 on the basis of a voice recognition result and selection is performed using the touch panel input unit 19, a time of interaction between the robot 2 and the visitor can be shortened and the response of the voice does not need to undergo voice recognition again. Thus, high recognition accuracy can be acquired.

For example, in FIG. 8, when the robot 2 requests confirmation from the visitor using an audio signal such as "Is your name Tanaka? Is your name Takenaka? Is your name Manaka?" the voice processing apparatus 1A needs to perform voice recognition again on the response "My name is Tanaka" according to the confirmation from the visitor. In this case, as described above, if the recognition rate is 90%, the voice recognition is performed twice, and the recognition rate is thus reduced to 80% (=0.9^2). On the other hand, according to the embodiment, since the voice recognition is completed once using a display on the image display unit 18 and selection through the touch panel input unit 19, the recognition rate of 90% can be acquired.

Third Embodiment

In the second embodiment, for example, as shown in FIG. 8, an example in which all of the items are displayed on the image display unit 18 and selected through an operation of the touch panel input unit 19 has been described. However, in this embodiment, an example in which only the predetermined usage timing and item are selected through the operation of the touch panel input unit 19 will be described.

A constitution of the voice processing apparatus 1A is the same as that of the second embodiment, but the presence of a usage and a usage timing of the touch panel input unit 19 are associated with priority and stored in the scenario storage unit 171 as shown in FIG. 11. Note that information stored in the scenario storage unit 171 will be described below.

<Example of Information Related to People Who are in Charge Stored in DB 15>

An example of information related to people who are in charge stored in the DB 15 will be described first.

FIG. 10 is a view showing an example of information associated with the people who are in charge stored in the DB 15 related to the first to third embodiments.

As shown in FIG. 10, departments to which the people who are in charge belong, names, telephone numbers, sexes, and main tasks of the people who are in charge, etc. are associated with readings of the family names of the people who are in charge and stored in the DB 15. The example illustrated in FIG. 9 corresponds to an example of information in which the readings of the family names of the people who are in charge are "suzuki (すずき)" and "yoshida (よしだ)." In the example illustrated in FIG. 9, the number of people who are in charge with the reading of "suzuki (すずき)" is 4, and the number of people who are in charge with the reading of "yoshida (よしだ)" is 2.

<Example of Priority and Scenario>

Next, an example of information stored in the scenario storage unit 171 related to the embodiment will be described.

FIG. 11 is a view showing the example of the information stored in the scenario storage unit 171 related to the embodiment. As shown in FIG. 11, in the scenario storage unit 171, timings at which confirmation is performed and any item in which the touch panel input unit 19 is used are associated with a priority, the number of questions, and scenarios. As shown in FIG. 11, in the embodiment, selection through a touch panel input of the department to which the person who is in charge belongs and the name of the person who is in charge which are particularly important items is used together in the reception.

When the priority is 1, the question unit 17A asks the visitor a question to request him or her to utter four items and outputs a result of voice recognition and understanding of a response to the question using an audio signal as in the first embodiment. As shown in FIG. 11, in the embodiment, an audio signal of the answer of the visitor is used without using the touch panel input unit 19 to acquire an answer of the visitor with respect to the understood result.

Next, when the priority is 2 or 3, the question unit 17A asks and receives confirmation from the visitor about four items as in the first embodiment. As shown in FIG. 11, in the embodiment, the company to which the visitor belongs and the visitor's name are confirmed using an audio signal as in the first embodiment, and an answer using an audio signal is acquired. Also, confirmation regarding the department to which the person who is in charge belongs and the name of the person who is in charge is displayed on the image display unit 18, and a selection result is acquired using the touch panel input unit 19.

When the number of candidates is three or less as a result of referring to the DB 15, the intention understanding unit 16 selects all names of the people who are in charge serving as candidates. Also, the intention understanding unit 16 reads information associated with the selected candidates and outputs the information associated with the read candidates to the scenario selection unit 172A.

When the number of candidates is four or more as a result of referring to the DB 15, the intention understanding unit 16 selects the stored top three among candidates with the family name of the same reading stored in the DB 15. Also, the intention understanding unit 16 reads information associated with the selected candidates and outputs the information associated with the read candidates to the scenario selection unit 172A.

As shown in FIG. 11, in the embodiment, whether to respond using voice or to select through an image display and a touch panel is set according to a priority, a timing at which confirmation is performed, an importance of a purpose word that needs to be acquired, etc.

The example illustrated in FIG. 11 is one example, and a timing at which confirmation of the visitor is requested and an item in which a touch panel input is used are not limited thereto. In addition, an order in which questions are asked is not limited thereto either. The department to which the person who is in charge belongs and the name of the person who is in charge may be asked about and acquired before the company to which the visitor belongs and the visitor's name. Also, a method of asking questions is not limited to a method of asking about each item either, and as shown in FIG. 5, the name of the person who is in charge may be asked about and then the department to which the person who is in charge may be asked about from candidates on the basis of the acquired response.

<Example of Image Displayed on Image Display Unit 18>

Next, an example of an image displayed on the image display unit 18 will be described.

For example, when the priority is 2, in the image display unit 18, an image of a region surrounded by the chain line g113 and the chain line g114 in FIG. 8 is displayed on the image display unit 18. The visitor operates the touch panel input unit 19 and performs confirmation or selection on the items.

For example, when the priority is 3, the intention understanding unit 16 selects a candidate by referring to the DB 15 if "suzuki ( すずき )" is acquired as the name of the person who is in charge through the reception illustrated in FIG. 5.

FIG. 12 is a view showing an example of an image g201 displayed on the image display unit 18 related to the embodiment. The example illustrated in FIG. 12 corresponds to a display example when there are a plurality of candidates with respect to the reading "suzuki ( すずき )."

The example illustrated in FIG. 12 corresponds to an example in which the name of the person who is in charge is "suzuki ( すずき )," and three candidates are displayed. In this case, as shown in FIG. 12, the department to which the person who is in charge belongs is associated with the name. Thus, one button is set for each of regions surrounded by chain lines g211, g212, and g213. For example, a first candidate is selected in the region surrounded by the chain line g211 if even any one of a candidate column, a department column, and a name column is selected through an operation of the touch panel input unit 19.

As shown in FIG. 12, the departments may be omitted or displayed such that the visitor can easily determine them. For example, when there are a plurality of the same readings and the candidates belong to the same department, a lower-order division may be displayed. Similarly, even with regard to the family name, full names are displayed when there are a plurality of people who are in charge with the family name of the same Chinese characters, and only the family name is displayed when there is one corresponding person who is in charge with the family name of the Chinese characters.

In the related art, when understanding of the intention understanding unit is incorrect, for example, when a visitor utters "I'm looking for a person who is blonde in the ZZZ Department.", an incorrect case in which "blonde" is understood as a name of a person who is in charge can also occur. In this case, even if the visitor is repeatedly asked the same question again, the recognition rate cannot be improved. According to the first to third embodiments, since a question is changed to draw out a purpose word for every priority, and a timing at which the question is interrupted and a timing at which a result of recognizing/understanding the question is confirmed are changed, the recognition rate for one item can be improved as described above.

As described above, in the embodiment, a response and voice recognition using voice or selection of an image display and the touch panel input unit 19 are used together according to a priority, an importance of a purpose word that needs to be acquired, etc.

As a result, according to the embodiment, even if, for example, there are a plurality of candidate names with respect to a person who is in charge as a voice recognition result, the names are displayed in order of highest possibility through the N-best retrieval and selected by the user so that a task load of the user can be reduced and a time required for a response can be shortened.

In the first to third embodiments, among reception tasks at a company, an example of interaction with the visitor regarding the person who is in charge has been described, but the interaction with the visitor is not limited thereto. The robot 2 in the embodiment may perform interaction regarding reception for a taxi, guidance to a site, etc. among the reception tasks at the company. Also, the robot 2 in the embodiment can also be used in reception for an event, reception at a hotel, a ticket sales window task, etc. In this case, information such as models according to an application, scenarios, a priority, and timings at which confirmation of a visitor is performed for each priority are stored in the DB 15 and the scenario storage unit 171.

In the first to third embodiments, an example in which the voice processing apparatus 1 (or 1A) is mounted on the robot 2 has been described, but the present invention is not limited thereto. The voice processing apparatus 1 (or 1A) may be mounted on, for example, a mobile phone such as a smartphone, a tablet terminal, etc.

In the first to third embodiments, when the voice processing apparatus 1 (or 1A) includes the imaging unit 10 and the image recognition unit 11, an image of a visitor's face, a company to which the visitor belongs, and a visitor's lifetime may be associated and stored in, for example, the DB 15. Thus, the voice processing apparatus 1 (or 1A) and recognition of an image of the visitor's face may be used together to specify the visitor in addition to recognition of a voice of the visitor.

Note that a program for realizing a function of the voice processing apparatus 1 (or 1A) in the present invention is recorded on a computer-readable recording medium, and the program recorded on this recoding medium is read by and executed in a computer system so that voice recognition, intention understanding, and interaction with a visitor may be performed. Also, "the computer system" described here is assumed to include an operating system (OS) and hardware such as peripheral apparatuses. "The computer system" is also assumed to have a WWW system including a home page provision environment (or a display environment).

"The computer-readable recording medium" refers to a portable medium such as a flexible disk, a magneto optical disc, a ROM, a CD-ROM, and a storage apparatus such as hard disk built in a computer system. "The computer-readable recording medium" is also assumed to include a medium storing a program during a certain period of time such as a volatile memory (RAM) inside the computer system serving as a server or a client when a program is transmitted via a network such as the Internet or a communication line such as a telephone line.

In addition, the above-described program may be transmitted from a computer system storing the program in a storage apparatus or the like via a transmission medium or transmitted to another computer system by transmission waves in a transmission medium. Here, "the transmission medium" for transmitting the program refers to a medium having a function of transmitting information, such as a network (communication network) like the Internet or a communication circuit (communication line) like a telephone circuit. In addition, the above-described program may be a program for implementing some of the above-described functions. Further, the above-described program may be a program, i.e., a so-called differential file (differential program), capable of implementing the above-described function in combination with a program already recorded on the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A voice processing apparatus comprising:
    a sound input unit configured to acquire an audio signal via a microphone;
    a voice recognition unit configured to perform voice recognition, via a voice processing device, on the audio signal acquired by the sound input unit;
    an intention understanding unit configured to understand a user's intention on the basis of a recognition result recognized by the voice recognition unit; and
    a question unit configured to question the user via a speaker or an image display unit,
    wherein the question unit sets question content for the user according to a predetermined priority,
    wherein the question unit generates a confirmation question to confirm whether an understood result understood by the intention understanding unit is correct and changes the priority on the basis of an understood result of the confirmation question by the intention understanding unit,
    wherein the question unit reduces the question content to less than the current question content according to the priority, and
    wherein the priority is based on a number of questions which have been asked to the user.

2. The voice processing apparatus according to claim 1, further comprising: the image display unit, wherein candidates for content of the user's intention are displayed on the image display unit on the basis of the understood result so that the user is able to select the candidates.

3. The voice processing apparatus according to claim 2, wherein the question unit extracts candidates regarding utterance content of the user using N-Best retrieval through the voice recognition unit and displays the extracted candidates on the image display unit.

4. A voice processing method comprising:
    a sound input process of acquiring an audio signal via a microphone;
    a voice recognition process of performing voice recognition on the audio signal acquired by the sound input process via a voice processing device;
    an intention understanding process of understanding a user's intention on the basis of a recognition result recognized by the voice recognition process; and
    a question process of questioning the user via a speaker or an image display unit;
    wherein question content for the user is set according to a predetermined priority,
    wherein the question process includes generating a confirmation question to confirm whether an understood result understood by the intention understanding process is correct and changes the priority on the basis of an understood result of the confirmation question by the intention understanding process,
    wherein the question process includes reducing the question content to less than the current question content according to the priority,
    and wherein the priority is based on a number of questions which have been asked to the user.

* * * * *